US011257309B2

(12) United States Patent
Watson et al.

(10) Patent No.: US 11,257,309 B2
(45) Date of Patent: *Feb. 22, 2022

(54) SYSTEMS AND METHODS TO TEST AN AUTONOMOUS VEHICLE

(71) Applicant: UATC, LLC, San Francisco, CA (US)

(72) Inventors: Adam Watson, Ford City, PA (US);
Chad David McIntosh, Pittsburgh, PA (US); Anthony Bembic, Pittsburgh, PA (US); Joseph Richard Leja, Coraopolis, PA (US)

(73) Assignee: UATC, LLC, Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/585,482

(22) Filed: Sep. 27, 2019

(65) Prior Publication Data

US 2020/0027292 A1    Jan. 23, 2020

Related U.S. Application Data

(63) Continuation of application No. 15/697,044, filed on Sep. 6, 2017, now Pat. No. 10,431,023.

(60) Provisional application No. 62/548,061, filed on Aug. 21, 2017.

(51) Int. Cl.
*G05D 1/00* (2006.01)
*G07C 5/00* (2006.01)
*G07C 5/08* (2006.01)

(52) U.S. Cl.
CPC ......... *G07C 5/0841* (2013.01); *G05D 1/0088* (2013.01); *G05D 2201/0213* (2013.01)

(58) Field of Classification Search
CPC ...... G07C 5/0841; G07C 5/08; G05D 1/0088; G05D 2201/0213; G01M 17/0078; G01M 17/007
See application file for complete search history.

(56) References Cited

U.S. PATENT DOCUMENTS

| 8,849,494 | B1 * | 9/2014 | Herbach | B60W 60/0015 |
| | | | | 701/24 |
| 9,541,410 | B1 * | 1/2017 | Herbach | G01C 21/34 |
| 9,754,325 | B1 * | 9/2017 | Konrardy | B60W 40/09 |
| 10,024,766 | B2 | 7/2018 | Botello et al. | |
| 2007/0219720 | A1 * | 9/2007 | Trepagnier | G05D 1/0278 |
| | | | | 701/300 |
| 2007/0239322 | A1 | 10/2007 | McQuade et al. | |
| 2015/0142309 | A1 * | 5/2015 | Sun | B60W 10/00 |
| | | | | 701/469 |

(Continued)

*Primary Examiner* — Yonel Beaulieu
(74) *Attorney, Agent, or Firm* — Dority & Manning, P.A.

(57) ABSTRACT

The present disclosure provides systems and methods to test an autonomous vehicle. In particular, the systems and methods of the present disclosure can receive, from one or more test nodes of a preconfigured test track, log data indicating positions of elements of the test track over a period of time. Log data indicating parameters of an autonomous vehicle over the period of time can be received from the autonomous vehicle. The log data indicating the positions of the elements of the test track over the period of time can be compared with the log data indicating the parameters of the autonomous vehicle over the period of time to determine a performance metric of the autonomous vehicle on the test track over the period of time.

20 Claims, 7 Drawing Sheets

(56) References Cited

U.S. PATENT DOCUMENTS

| | | |
|---|---|---|
| 2017/0003199 A1 | 1/2017 | Botello et al. |
| 2017/0132118 A1* | 5/2017 | Stefan ................. G06F 11/3668 |
| 2018/0267538 A1* | 9/2018 | Shum ...................... G06F 30/20 |

* cited by examiner

SYSTEMS AND METHODS TO TEST AN AUTONOMOUS VEHICLE

PRIORITY CLAIM

This application is a continuation of U.S. application Ser. No. 15/697,044 having a filing date of Sep. 6, 2017, which issued as U.S. Pat. No. 10,431,023, and which claims priority to U.S. Patent Application Ser. No. 62/548,061, filed Aug. 21, 2017, and entitled "SYSTEMS AND METHODS TO TEST AN AUTONOMOUS VEHICLE". Applicant claims priority to and the benefit of each of such applications and incorporates all such applications herein by reference in its entirety.

FIELD

The present disclosure relates generally to autonomous vehicles. More particularly, the present disclosure relates to systems and methods to test an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to test an autonomous vehicle. The method includes receiving, from one or more test nodes of a preconfigured test track, log data indicating positions of elements of the test track over a period of time. The method includes receiving, from an autonomous vehicle, log data indicating parameters of the autonomous vehicle over the period of time. The method includes comparing the log data indicating the positions of the elements of the test track over the period of time with the log data indicating the parameters of the autonomous vehicle over the period of time to determine a performance metric of the autonomous vehicle on the test track over the period of time.

Another example aspect of the present disclosure is directed to a computing system that includes one or more processors and one or more non-transitory computer-readable media that collectively store instructions that, when executed by the one or more processors, cause the computing system to perform operations. The operations include comparing log data indicating positions of elements of a test track over a first period of time with log data indicating parameters of an autonomous vehicle over the first period of time to determine a performance metric of the autonomous vehicle on the test track over the first period of time. The operations include comparing log data indicating positions of the elements of the test track over a second period of time with log data indicating parameters of the autonomous vehicle over the second period of time to determine a performance metric of the autonomous vehicle on the test track over the second period of time. The operations include comparing the performance metric of the autonomous vehicle on the test track over the first period of time with the performance metric of the autonomous vehicle on the test track over the second period of time to determine an effect of modifying software configured to control operations of the autonomous vehicle.

Another example aspect of the present disclosure is directed to one or more non-transitory computer-readable media that collectively store instructions that, when executed by one or more processors, cause a computing system to perform operations. The operations include comparing log data indicating positions of elements of a test track over a first period of time with log data indicating positions of the elements of the test track over a second period of time. The operations include comparing log data indicating parameters of an autonomous vehicle over the first period of time with log data indicating the parameters of the autonomous vehicle over the second period of time. The operations include determining an effect of modifying, between the first period of time and the second period of time, software configured to control operations of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to methods and systems for testing an autonomous vehicle. For example, the systems and methods of the present disclosure can be utilized to test an autonomous vehicle before and after a modification to software configured to control operations of the autonomous vehicle in order to determine an effect of modifying the software on the operations of the autonomous vehicle. In particular, in some implementations, a test track can be configured with multiple tests for the autonomous vehicle. Each of the tests can be controlled by a test node, which can generate log data indicating the positions of elements of the test track associated with the test node at particular times. The positions of the elements of the test track can be compared to parameters of the autonomous vehicle at corresponding times to determine one or more performance metrics of the autonomous vehicle. For example, a test node can be associated with a simulated vehicle located on the test track. An autonomous vehicle can approach the simulated vehicle and the test node can cause the simulated vehicle to pull in front of the autonomous vehicle. Log data indicating the position of the simulated vehicle at various times can be compared with log data indicating parameters of the autonomous vehicle to determine when the autonomous vehicle detected the simulated vehicle and how the autonomous vehicle reacted to the simulated vehicle pulling in front of the autonomous vehicle.

In some implementations, after the autonomous vehicle has performed one or more of the tests on the test track, a modification can be made to software configured to control the autonomous vehicle. After the software configured to control the autonomous vehicle has been modified, the tests can be repeated. Log data indicating the positions of the elements of the test track can then be compared to parameters of the autonomous vehicle to determine a performance metric of the autonomous vehicle (e.g., the autonomous vehicle with the modified software). For example, log data indicating the position of the simulated vehicle at various times can be compared with log data indicating parameters of the autonomous vehicle to determine when the autonomous vehicle detected the simulated vehicle and how the autonomous vehicle reacted to the simulated vehicle pulling in front of the autonomous vehicle. A comparison between the performance metrics and/or log data from the previous tests can then be performed to determine an effect of modifying the software configured to control the autonomous vehicle on the operations of the autonomous vehicle. For example, a determination can be made as to whether the autonomous vehicle reacted more quickly to the simulated vehicle pulling in front of the autonomous vehicle before or after the software modification.

In some implementations, log data from each of the test nodes and the autonomous vehicle can be received by a central computing system. The log data from the test nodes can indicate the status and/or position of one or more actuators associated with a test node. For example, a test node can be configured to move a simulated vehicle into the path of the autonomous vehicle, and the log data can indicate the status and/or position of an actuator that controls the position of the simulated vehicle. Additionally or alternatively, the log data from the test node can indicate a position of one or more elements of the test track. For example, an element of the test track (e.g., a simulated vehicle) can have an attached global positioning system (GPS) receiver, and the log data can include GPS coordinates indicating a position of the element at a given time. The log data from the autonomous vehicle can indicate one or more parameters of the autonomous vehicle. For example, the autonomous vehicle can include a GPS receiver, and the log data can include GPS coordinates indicating a position of the autonomous vehicle at a given time. Additionally or alternatively, the log data from the autonomous vehicle can indicate a rate of acceleration of the autonomous vehicle, a rate of deceleration of the autonomous vehicle, a speed of the autonomous vehicle, and/or a heading of the autonomous vehicle.

In some implementations, a user device can receive feedback from a user (e.g., a rider) about the performance of the autonomous vehicle on one or more of the tests on the test track. For example, the feedback can describe an experience of the user during one or more of the tests (e.g., how smoothly the autonomous vehicle reacted to a simulated vehicle pulling out in front of the autonomous vehicle). In such implementations, the feedback can be utilized to determine one or more performance metrics of the autonomous vehicle in addition to the log data received from the test nodes and the autonomous vehicle. In some implementations, the performance metrics can measure smoothness in transition from one state of the autonomous vehicle to another. For example, the performance metrics can measure smoothness in transition of the autonomous vehicle from a given cruising speed to a stopped state or from a given heading to a new heading (e.g., the performance metrics can be based on a rate of change of the speed of the autonomous vehicle or the heading of the autonomous vehicle).

The test nodes of the test track can be configured to subject the autonomous vehicle to a variety of simulated conditions. For example, in some implementations, a test node can be configured to simulate a traffic light. In such implementations, the test node can be configured to change a traffic light as the autonomous vehicle approaches the traffic light. The test node can log the time the autonomous vehicle approached the traffic light and the time the traffic light was changed (e.g., from green to yellow). The log data generated by the test node can then be compared to parameters logged by the autonomous vehicle to determine how efficiently the autonomous vehicle detected the change in the traffic light and/or responded to the change in the traffic light (e.g., began braking). Similarly, in some implementations, a test node can be configured to simulate a vehicle pulling in front of the autonomous vehicle. In such implementations, the test node can be configured to cause a simulated vehicle to pull in front of the autonomous vehicle as the autonomous vehicle approaches the simulated vehicle (e.g., at an intersection). The test node can log the time the autonomous vehicle approached the simulated vehicle and the position of the simulated vehicle at various positions as the simulated vehicle is pulled in front of the autonomous vehicle. The log data generated by the test node can then be compared to parameters logged by the autonomous vehicle to determine how efficiently the autonomous vehicle detected the simulated vehicle and determined how the autonomous vehicle would respond to the simulated vehicle pulling out in front of the autonomous vehicle (e.g., by braking).

In some implementations, a test node can be configured to simulate a cyclist approaching the autonomous vehicle. In such implementations, the test node can be configured to cause a simulated cyclist to approach the autonomous vehicle. The test node can log the time the autonomous vehicle approached the simulated cyclist and the position of the simulated cyclist at various positions as the simulated cyclist approaches the autonomous vehicle. The log data generated by the test node can then be compared to parameters logged by the autonomous vehicle to determine how efficiently the autonomous vehicle detected the simulated cyclist and determined how the autonomous vehicle would respond to the simulated cyclist approaching the autonomous vehicle (e.g., by increasing a distance between the autonomous vehicle and the simulated cyclist). Similarly, in some implementations, a test node can be configured to simulate a pedestrian walking in front of the autonomous vehicle. In such implementations, the test node can be configured to cause a simulated pedestrian to walk in front of the autonomous vehicle as the autonomous vehicle approaches the simulated pedestrian (e.g., at a crosswalk). The test node can log the time the autonomous vehicle approached the simulated pedestrian and the position of the simulated pedestrian at various positions as the simulated pedestrian walks in front of the autonomous vehicle. The log data generated by the test node can then be compared to parameters logged by the autonomous vehicle to determine how efficiently the autonomous vehicle detected the simulated pedestrian and determined how the autonomous vehicle would respond to the simulated pedestrian walking in front of the autonomous vehicle (e.g., by braking).

The systems and methods described herein can provide a number of technical effects and benefits. For example, the systems and methods described herein can be utilized to measure the performance of an autonomous vehicle in an automated manner that provides objective feedback on the performance of the autonomous vehicle under various conditions. Additionally, the systems and methods described herein can be utilized to objectively determine the effect of one or more software changes on the performance of an autonomous vehicle under various conditions that can be replicated between software modifications.

With reference now to the Figures, example embodiments of the present disclosure will be discussed in further detail.

Figure 1:
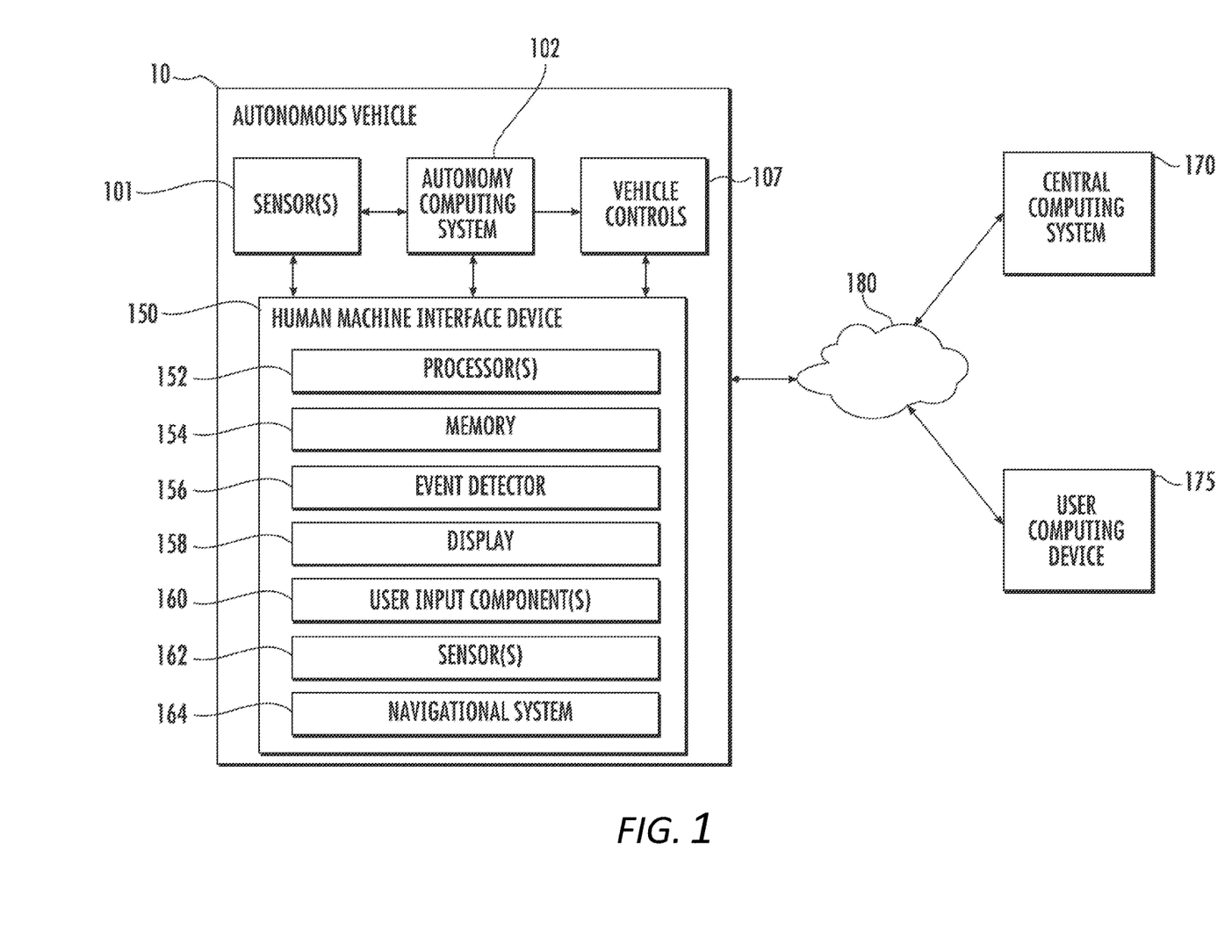
FIG. 1 depicts a block diagram of an example computing system according to example embodiments of the present disclosure.

FIG. 1 depicts a block diagram of an example computing system according to example embodiments of the present disclosure. Referring to FIG. 1, the example computing system includes autonomous vehicle 10, central computing system 170, and user computing device 175 that are communicatively coupled over one or more communication networks 180. Autonomous vehicle 10 can include one or more sensors 101, autonomy computing system 102, one or more vehicle controls 107, and human machine interface device 150.

Human machine interface device 150 can enable communication, control, and/or other interface actions to occur between autonomous vehicle 10 and a human (e.g., a passenger located within autonomous vehicle 10). Human machine interface device 150 can be communicatively coupled to autonomy computing system 102 to enable exchange of data, instructions, and/or requests between system 102 and device 150.

Human machine interface device 150 can include or be implemented by one or more computing devices that are operatively connected. Human machine interface device 150 can be an embedded computing device or a stand-alone computing device. In one particular example, human machine interface device 150 can be a tablet computing device that is positioned within autonomous vehicle 10 for viewing by a passenger (e.g., within a rear seat area of autonomous vehicle 10).

Human machine interface device 150 can include one or more processors 152, memory 154, event detector 156, display 158, one or more user input components 160, one or more sensors 162, and navigational system 164. Processor(s) 152 can be any suitable processing device (e.g., a processor core, a microprocessor, an application-specific integrated circuit (ASIC), a field-programmable gate array (FPGA), a controller, a microcontroller, etc.) and can be one processor or a plurality of processors that are operatively connected. Memory 154 can include one or more non-transitory computer-readable storage media, such as random-access memory (RAM), read-only memory (ROM), electrically erasable programmable read-only memory (EEPROM), erasable programmable read-only memory (EPROM), one or more memory devices, flash memory devices, etc., and combinations thereof.

Memory 154 can store information that can be accessed by processor(s) 152. For instance, memory 154 (e.g., one or more non-transitory computer-readable storage mediums, memory devices) can store data that can be obtained, received, accessed, written, manipulated, created, and/or stored. Memory 154 can also store computer-readable instructions that can be executed by processor(s) 152. The instructions can be software written in any suitable programming language or can be implemented in hardware. Additionally, or alternatively, the instructions can be executed in logically and/or virtually separate threads on processor(s) 152. For example, memory 154 can store instructions that when executed by processor(s) 152 cause processor(s) 152 to perform any of the operations and/or functions described herein.

In some implementations, human machine interface device 150 can include display device 158 (e.g., a touch-sensitive display device) and/or other input/output components 160 that provide an interactive user interface. For example, display device 158 can be a rear-seat display device that is accessible by a passenger that is located in a rear seat of autonomous vehicle 10.

In some implementations, in addition or alternatively to human machine interface device 150, the systems and methods of the present disclosure can include or leverage user computing device 175 that is associated with the passenger. For example, in some implementations, in addition or alternatively to the display of the user interface by human machine interface device 150, the interactive user interface can be provided on or accessible via a display of user computing device 175. User computing device 175 can be communicatively connected to human machine interface device 150 via a local area network such as a short range wireless connection (e.g., a Bluetooth, ZigBee, near-field communication (NFC), infrared, etc.) or other forms of connections (e.g., hardwiring). As examples, user computing device 175 can be a smartphone, tablet computing device, wearable computing device, portable gaming device, handheld display screen, or other form of computing device.

In yet further implementations, certain operations described herein can be performed by central computing system 170 that is remotely located to autonomous vehicle 10 and in communication with autonomous vehicle 10 over network(s) 180 (e.g., cellular data networks, satellite communication networks, wide area networks, etc.). As an example, central computing system 170 can include one or more server computing devices. In the event that plural server computing devices are used, the server computing devices can be arranged according to a parallel computing architecture, a sequential computing architecture, or combinations thereof. In some implementations, central computing system 170 can provide control, monitoring, management, and/or other functionality for a fleet of autonomous vehicles including autonomous vehicle 10.

Network(s) 180 can be any type of network or combination of networks that allows for communication between devices. In some embodiments, network(s) 180 can include one or more of a local area network, wide area network, the Internet, secure network, cellular network, mesh network, peer-to-peer communication link, and/or some combination thereof, and can include any number of wired or wireless links. Communication over network(s) 180 can be accomplished, for instance, via a network interface using any type of protocol, protection scheme, encoding, format, packaging, etc.

Figure 2:
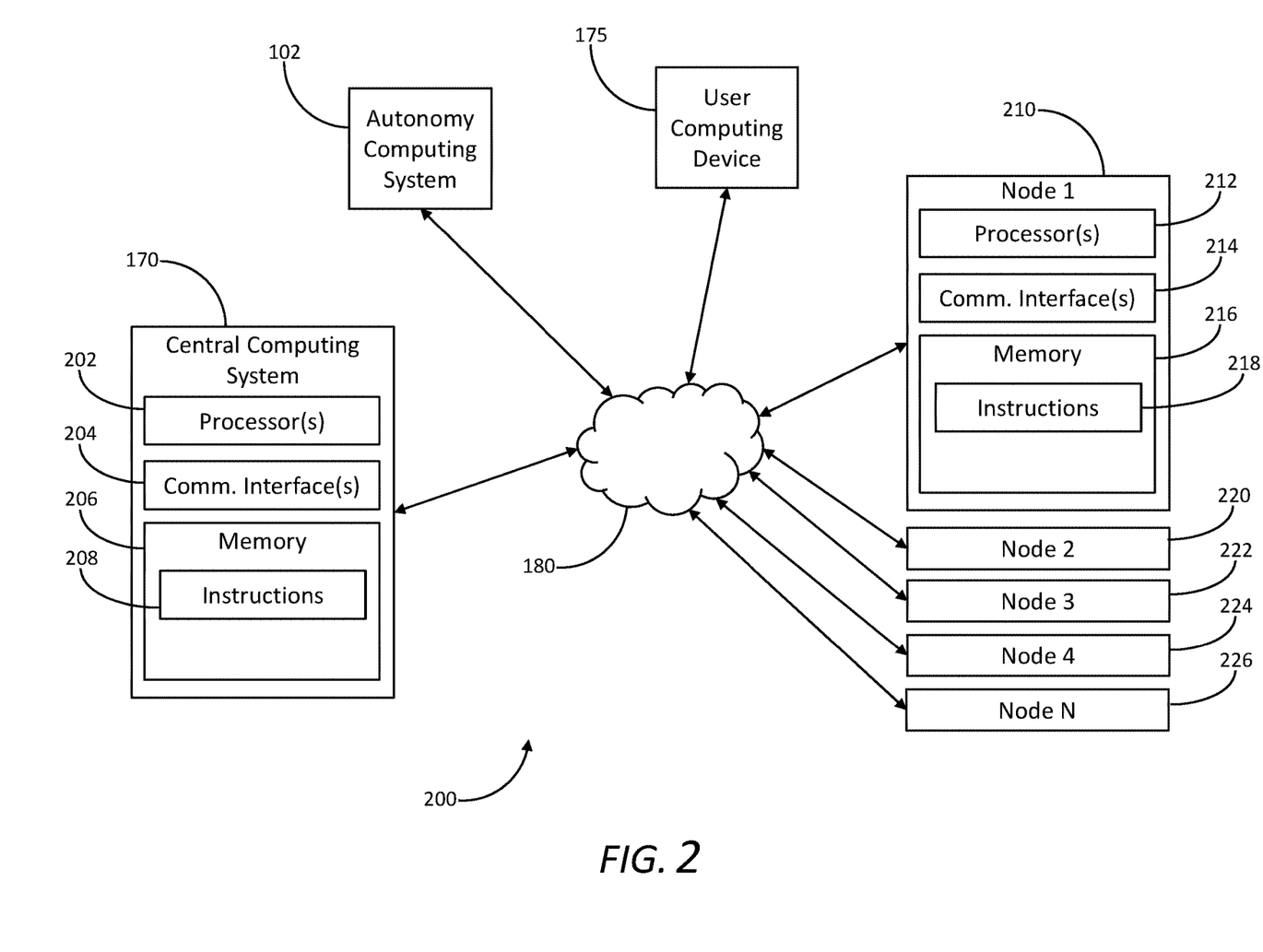
FIG. 2 depicts an example computing environment for testing autonomous vehicles according to example embodiments of the present disclosure.

FIG. 2 depicts an example computing environment for testing autonomous vehicles according to example embodiments of the present disclosure. Referring to FIG. 2, environment 200 can include central computing system 170, autonomy computing system 102, and user computing device 175. Central computing system 170 can include one or more processors 202, communication interfaces 204, and memory 206. Memory 206 can include instructions 208. Instructions 208, when executed by processor(s) 202, can cause central computing system 170 to perform one or more of the functions described herein. As will be described in greater detail below, environment 200 can also include one or more test nodes associated with various elements or components of a test track. For example, environment 200 can include test nodes 210, 220, 222, 224, and 226. Test node 210 can comprise one or more processors 212, communication interfaces 214, and memory 216. Memory 216 can include instructions 218. Instructions 218, when executed by processor(s) 212, can cause node 210 to perform one or more of the functions described herein. It will be appreciated that nodes 220, 222, 224, and/or 226 can comprise components similar to those described above with respect to node 210. Network(s) 180 can interface central computing system 170, autonomy computing system 102, user computing device 175, and/or one or more of nodes 210, 220, 222, 224, and/or 226.

Figure 3:
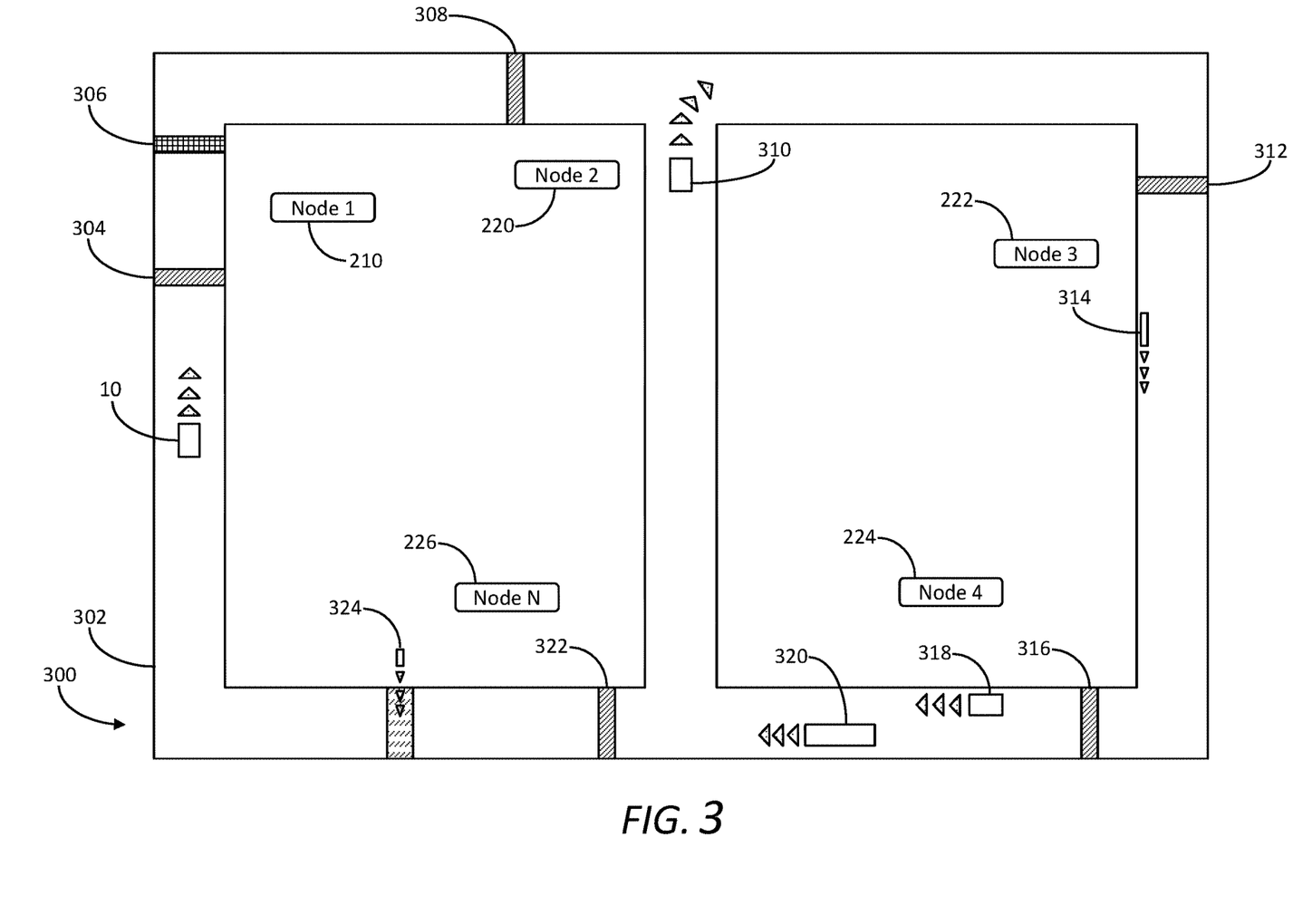
FIG. 3 depicts an example test environment according to example embodiments of the present disclosure.

FIG. 3 depicts an example test environment according to example embodiments of the present disclosure. Referring to FIG. 3, environment 300 can include test track 302 for autonomous vehicles. Track 302 can include multiple tests, obstacles, simulations, or the like for an autonomous vehicle (e.g., autonomous vehicle 10) to perform, navigate, experience, or the like. Each of the tests, obstacles, simulations, or the like can be managed, coordinated, and/or monitored by a test node. For example, nodes 210, 220, 222, 224, and 226 can each be configured to manage, coordinate, and/or monitor one or more tests, obstacles, simulations, or the like associated with track 302. In some implementations, a test can include a simulated traffic light. For example, node 210 can be associated with sensor 304 and traffic light 306. Node 210 can be configured to detect autonomous vehicle 10 approaching traffic light 306 via sensor 304 and to change the status and/or position of one or more elements associated with traffic light 306 (e.g., from green to yellow, yellow to red, or the like). Node 210 can be further configured to generate log data indicating a time at which autonomous vehicle 10 was detected via sensor 304 and/or a time at which the status and/or position of the element(s) associated with traffic light 306 were changed.

Additionally or alternatively, a test can include a simulated vehicle. For example, node 220 can be associated with sensor 308 and simulated vehicle 310 (e.g., a remotely controlled vehicle, object resembling a vehicle, or the like). Node 220 can be configured to detect autonomous vehicle 10 approaching simulated vehicle 310 via sensor 308 and to change the status and/or position of one or more elements associated with simulated vehicle 310 (e.g., to simulate simulated vehicle 310 pulling into the path of autonomous vehicle 10, or the like). Node 220 can be further configured to generate log data indicating a time at which autonomous vehicle 10 was detected via sensor 308 and/or a time at which the status and/or position of the element(s) associated with simulated vehicle 310 were changed.

Similarly, a test can include a simulated cyclist. For example, node 222 can be associated with sensor 312 and simulated cyclist 314 (e.g., a remotely controlled object resembling a cyclist, or the like). Node 222 can be configured to detect autonomous vehicle 10 approaching simulated cyclist 314 via sensor 312 and to change the status and/or position of one or more elements associated with simulated cyclist 314 (e.g., to simulate simulated cyclist 314 pulling into the path of autonomous vehicle 10, or the like). Node 222 can be further configured to generate log data indicating a time at which autonomous vehicle 10 was detected via sensor 312 and/or a time at which the status and/or position of the element(s) associated with simulated cyclist 314 were changed.

Additionally or alternatively, a test can include multiple simulated vehicles. For example, node 224 can be associated with sensor 316 and simulated vehicles 318 and 320 (e.g., remotely controlled vehicles, objects resembling vehicles, or the like). Node 224 can be configured to detect autonomous vehicle 10 approaching simulated vehicles 318 and 320 via sensor 316 and to change the status and/or position of one or more elements associated with simulated vehicles 318 and 320 (e.g., to simulate simulated vehicles 318 and/or 320 pulling into the path of or alongside autonomous vehicle 10, or the like). Node 224 can be further configured to generate log data indicating a time at which autonomous vehicle 10 was detected via sensor 316 and/or a time at which the status and/or position of the element(s) associated with simulated vehicles 318 and/or 320 were changed.

Similarly, a test can include a simulated pedestrian. For example, node 226 can be associated with sensor 322 and simulated pedestrian 324 (e.g., a remotely controlled object resembling a pedestrian, or the like). Node 226 can be configured to detect autonomous vehicle 10 approaching simulated pedestrian 324 via sensor 322 and to change the status and/or position of one or more elements associated with simulated pedestrian 324 (e.g., to simulate simulated pedestrian 324 walking into the path of autonomous vehicle 10, or the like). Node 226 can be further configured to generate log data indicating a time at which autonomous vehicle 10 was detected via sensor 322 and/or a time at which the status and/or position of the element(s) associated with simulated pedestrian 324 were changed.

Figure 4A:
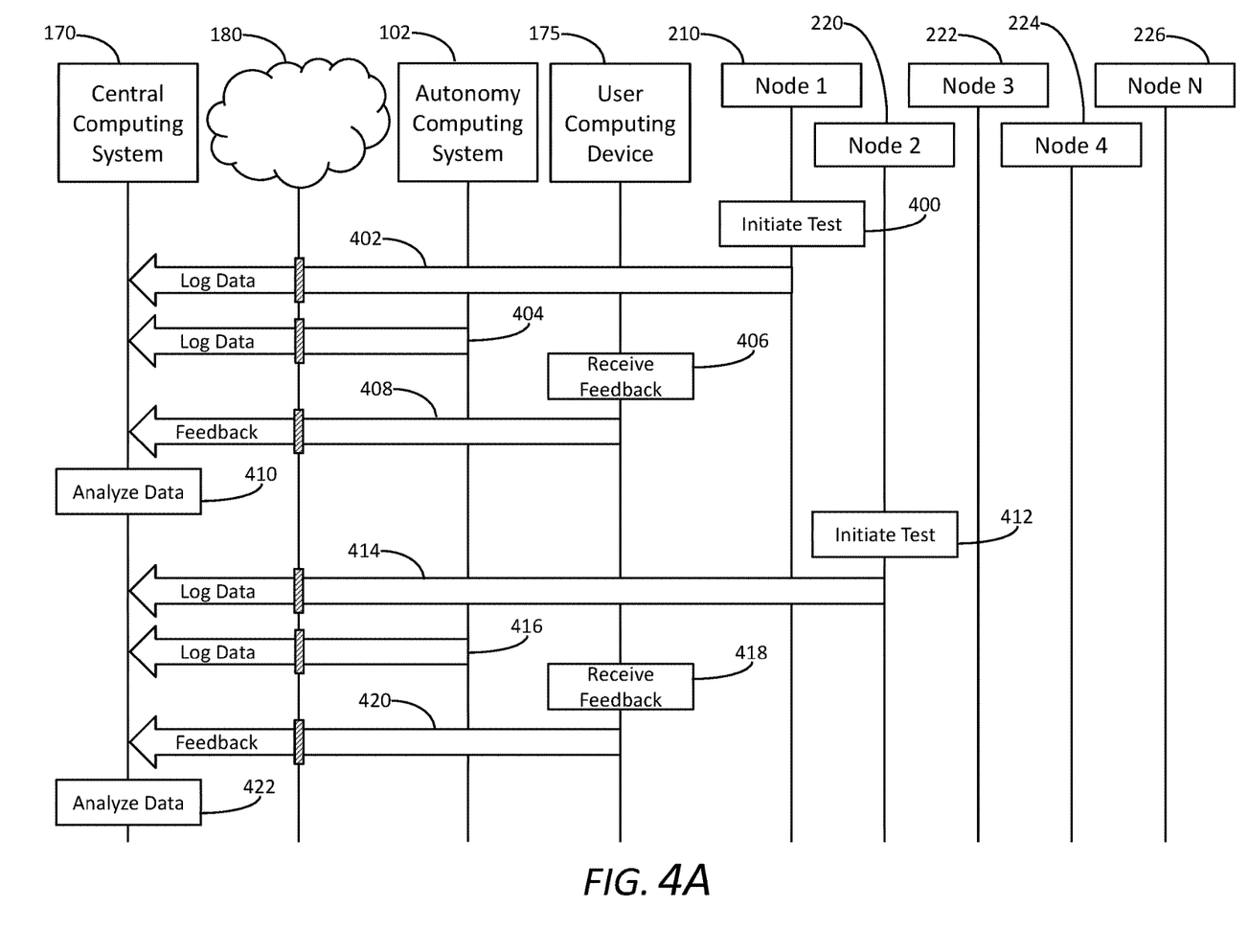
FIGS. 4A, 4B, and 4C depict an example event sequence for testing an autonomous vehicle according to example embodiments of the present disclosure.
Figure 4B:
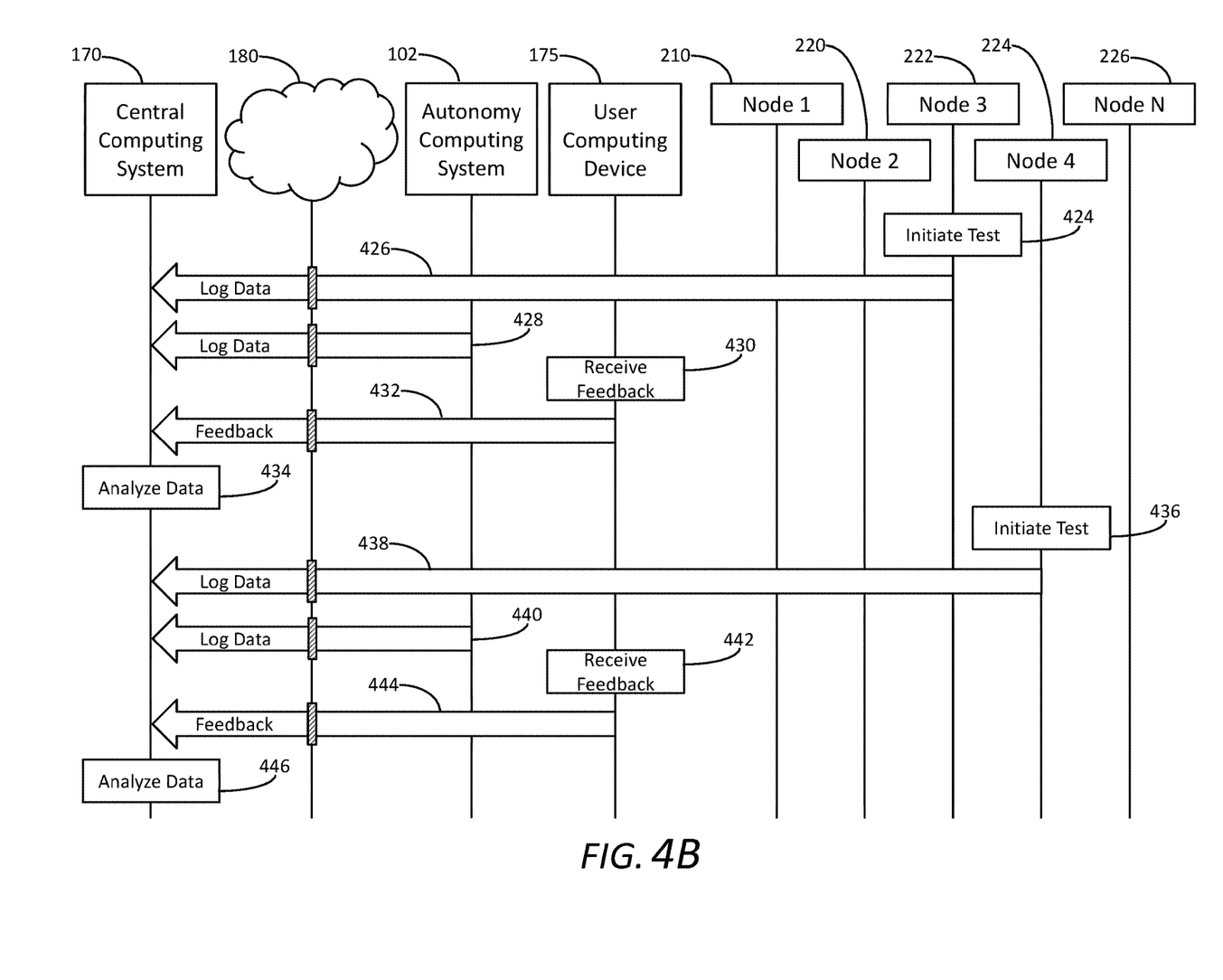
Figure 4C:
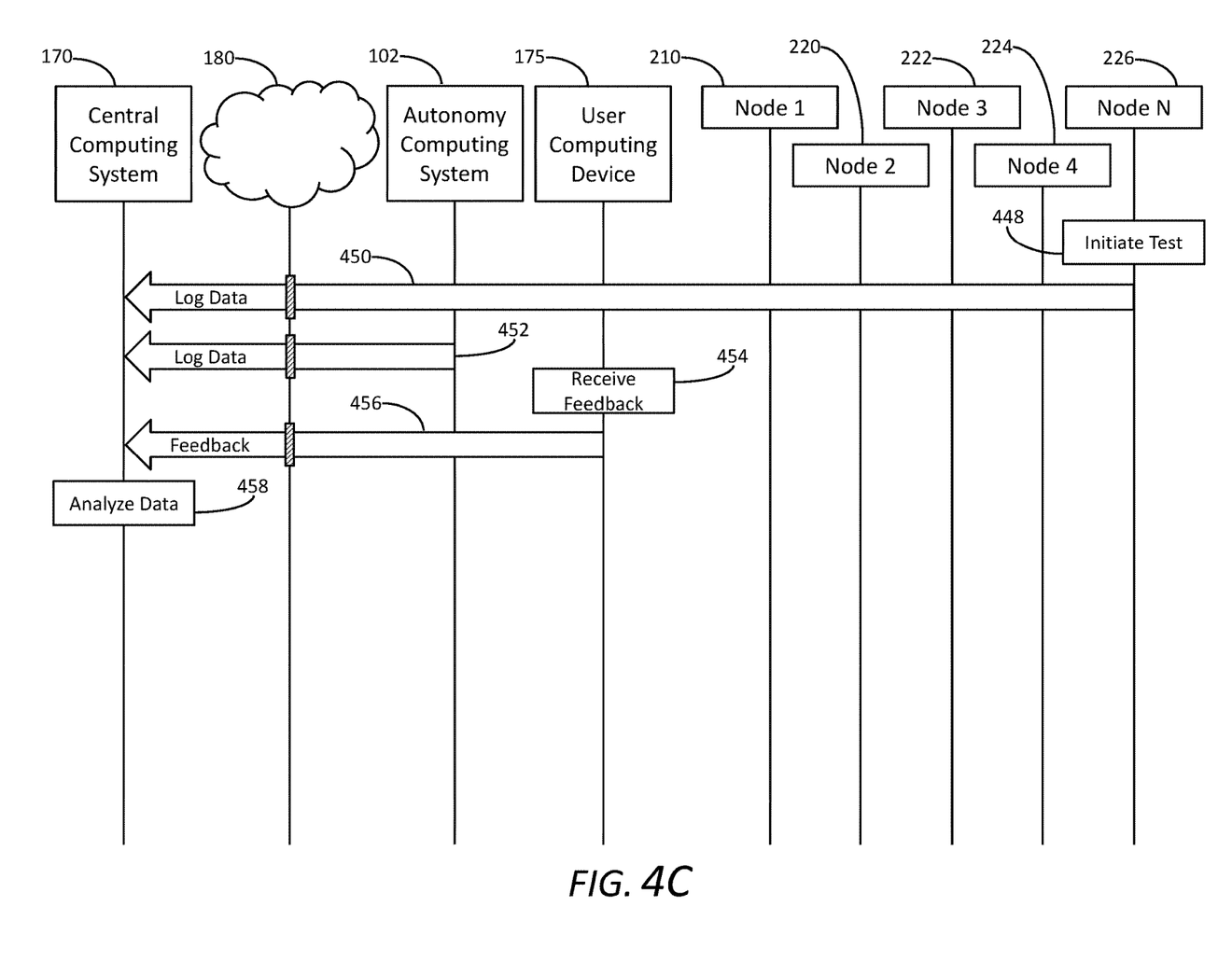

FIGS. 4A, 4B, and 4C depict an example event sequence for testing an autonomous vehicle according to example embodiments of the present disclosure. Referring to FIG. 4A, at (400), node 210 can initialize a test for autonomous vehicle 10. For example, autonomous vehicle 10 can approach traffic light 306, and sensor 304 can detect autonomous vehicle 10 approaching traffic light 306. Node 210 can be configured to modify the status and/or position of one or more elements associated with traffic light 306 in response to sensor 304 detecting autonomous vehicle 10 approaching traffic light 306. For example, node 210 can be configured to change traffic light 306 from a green signal to a yellow signal, from a yellow signal to a red signal, or the like. Node 210 can generate log data indicating a time at which sensor 304 detected autonomous vehicle 10 approaching traffic light 306 and/or one or more times at which the status and/or positions of element(s) associated with traffic light 306 were modified. Autonomous vehicle 10 can respond to the modification of the status or positions of the element(s) associated with traffic light 306. For example, responsive to node 210 changing traffic light 306, autonomous vehicle 10 can detect the change in traffic light 306 and execute a routine to bring autonomous vehicle 10 to a stop. At (402), node 210 can communicate the log data to central computing system 170 via network(s) 180 (as indicated by the cross hatched box over the line extending downward from network(s) 180), and central computing system 170 can receive the log data.

At (404), autonomy computing system 102 can communicate log data indicating parameters of autonomous vehicle 10 to central computing system 170 via network(s) 180, and central computing system 170 can receive the log data. For example, the log data can indicate a time at which autonomous vehicle 10 detected the change in traffic light 306, a time at which autonomous vehicle 10 executed a routine to bring autonomous vehicle 10 to a stop, a time at which autonomous vehicle 10 came to a stop, or the like. At (406), user computing device 175 can receive feedback from a user (e.g., a passenger of autonomous vehicle 10) regarding the performance of autonomous vehicle 10. For example, user computing device 175 can receive feedback from a passenger of autonomous vehicle 10 describing the subjective experience of the passenger regarding the performance of autonomous vehicle 10 in responding to the change in traffic light 306. At (408), user computing device 175 can communicate the feedback to central computing system 170 via network(s) 180, and central computing system 170 can receive the feedback.

At (410), central computing system 170 can analyze the log data received from node 210 and autonomy computing system 102. For example, central computing system 170 can compare the log data received from node 210 with the log data received from autonomy computing system 102 to determine a performance metric of autonomous vehicle 10. For example, central computing system 170 can compare a time indicated by the log data received from node 210 (e.g., a time at which traffic light 306 was changed) with a time indicated by the log data received from autonomy computing system 102 (e.g., a time at which autonomous vehicle 10 detected the change in traffic light 306, a time at which autonomous vehicle 10 executed a routine to bring autonomous vehicle 10 to a stop, and/or a time at which autonomous vehicle 10 was brought to a stop) to determine a performance metric of autonomous vehicle 10 (e.g., how efficiently autonomous vehicle 10 responded to the change in traffic light 306). In some implementations, the performance metric can be based on the feedback received from user computing device 175. For example, the performance metric can indicate a measure of smoothness in transition from one state to another of the autonomous vehicle (e.g., from a cruising speed to stop), the feedback received from user computing device 175 can describe the subjective experience of a passenger of autonomous vehicle 10 regarding the performance of autonomous vehicle 10 in responding to the change in traffic light 306 (e.g., the smoothness of the stop executed by autonomous vehicle 10), and the performance metric can be based, at least in part, on the feedback received from user computing device 175.

At (412), node 220 can initialize a test for autonomous vehicle 10. For example, autonomous vehicle 10 can approach simulated vehicle 310, and sensor 308 can detect autonomous vehicle 10 approaching simulated vehicle 310. Node 220 can be configured to modify the status and/or position of one or more elements associated with simulated vehicle 310 in response to sensor 308 detecting autonomous vehicle 10. For example, node 220 can be configured to control one or more actuators configured to adjust the position of simulated vehicle 310 on track 302, and in response to sensor 308 detecting autonomous vehicle 10, node 220 can modify the status and/or position of the actuator(s) to move simulated vehicle 310 into the path of autonomous vehicle 10. Node 220 can generate log data indicating a time at which sensor 308 detected autonomous vehicle 10 approaching simulated vehicle 310, one or more times at which the status and/or positions of element(s) associated with simulated vehicle 310 were modified, and/or the status and/or positions of the element(s) associated with simulated vehicle 310 (e.g., the status and/or position of the actuator(s) configured to adjust the position of simulated vehicle 310, a positon of simulated vehicle 310 on track 302, or the like). Autonomous vehicle 10 can respond to the modification of the status or positions of the element(s) associated with simulated vehicle 310. For example, responsive to node 220 modifying the status and/or position of the actuator(s) to move simulated vehicle 310 into the path of autonomous vehicle 10, autonomous vehicle 10 can detect the change in the position of simulated vehicle 310 (e.g., that simulated vehicle 310 has moved into its path) and execute a routine to bring autonomous vehicle 10 to a stop or otherwise modify its planned motion path (e.g., to avoid a collision with simulated vehicle 310). At (414), node 220 can communicate the log data to central computing system 170 via network(s) 180, and central computing system 170 can receive the log data.

At (416), autonomy computing system 102 can communicate log data indicating parameters of autonomous vehicle 10 to central computing system 170 via network(s) 180, and central computing system 170 can receive the log data. For example, the log data can indicate a time at which autonomous vehicle 10 detected the change in position of simulated vehicle 310, a time at which autonomous vehicle 10 executed a routine to bring autonomous vehicle 10 to a stop or otherwise modify its planned motion path, a time at which autonomous vehicle 10 came to a stop or otherwise modified its motion path, or the like. At (418), user computing device 175 can receive feedback from a user (e.g., a passenger of autonomous vehicle 10) regarding the performance of autonomous vehicle 10. For example, user computing device 175 can receive feedback from a passenger of autonomous vehicle 10 describing the subjective experience of the passenger regarding the performance of autonomous vehicle 10 in responding to the change in position of simulated vehicle 310. At (420), user computing device 175 can communicate the feedback to central computing system 170 via network (s) 180, and central computing system 170 can receive the feedback.

At (422), central computing system 170 can analyze the log data received from node 220 and autonomy computing system 102. For example, central computing system 170 can compare the log data received from node 220 with the log data received from autonomy computing system 102 to determine a performance metric of autonomous vehicle 10. For example, central computing system 170 can compare a time indicated by the log data received from node 220 (e.g., a time at which the position of simulated vehicle 310 was modified) with a time indicated by the log data received from autonomy computing system 102 (e.g., a time at which autonomous vehicle 10 detected the change in the position of simulated vehicle 310, a time at which autonomous vehicle 10 executed a routine to bring autonomous vehicle 10 to a stop or otherwise modify the motion path of autonomous vehicle 10, and/or a time at which autonomous vehicle 10 was brought to a stop or otherwise modified its motion path) to determine a performance metric of autonomous vehicle 10 (e.g., how efficiently autonomous vehicle 10 responded to the change in position of simulated vehicle 310). Additionally or alternatively, central computing system 170 can compare one or more positions of simulated vehicle 310 with one or more positions of autonomous vehicle 10 to determine a performance metric of autonomous vehicle 10 (e.g., how close autonomous vehicle 10 came to simulated vehicle 310). In some implementations, the performance metric can be based on the feedback received from user computing device 175. For example, the performance metric can indicate a measure of smoothness in transition from one state to another of the autonomous vehicle (e.g., from a cruising speed to stop or from one motion path to another), the feedback received from user computing device 175 can describe the subjective experience of a passenger of autonomous vehicle 10 regarding the performance of autonomous vehicle 10 in responding to the change in position of simulated vehicle 310 (e.g., the smoothness of the stop or change in motion path executed by autonomous vehicle 10), and the performance metric can be based, at least in part, on the feedback received from user computing device 175.

Referring to FIG. 4B, at (424), node 222 can initialize a test for autonomous vehicle 10. For example, autonomous vehicle 10 can approach simulated cyclist 314, and sensor 312 can detect autonomous vehicle 10 approaching simulated cyclist 314. Node 222 can be configured to modify the status and/or position of one or more elements associated with simulated cyclist 314 in response to sensor 312 detecting autonomous vehicle 10. For example, node 222 can be configured to control one or more actuators configured to adjust the position of simulated cyclist 314 on track 302, and in response to sensor 312 detecting autonomous vehicle 10, node 222 can modify the status and/or position of the actuator(s) to move simulated cyclist 314 into the path of autonomous vehicle 10. Node 222 can generate log data indicating a time at which sensor 312 detected autonomous vehicle 10 approaching simulated cyclist 314, one or more times at which the status and/or positions of element(s) associated with simulated cyclist 314 were modified, and/or the status and/or positions of the element(s) associated with simulated cyclist 314 (e.g., the status and/or position of the actuator(s) configured to adjust the position of simulated cyclist 314, a positon of simulated cyclist 314 on track 302, or the like). Autonomous vehicle 10 can respond to the modification of the status or positions of the element(s) associated with simulated cyclist 314. For example, responsive to node 222 modifying the status and/or position of the actuator(s) to move simulated cyclist 314 into the path of autonomous vehicle 10, autonomous vehicle 10 can detect the change in the position of simulated cyclist 314 (e.g., that simulated cyclist 314 has moved into its path) and execute a routine to bring autonomous vehicle 10 to a stop or otherwise modify its planned motion path (e.g., to avoid a collision with simulated cyclist 314). At (426), node 222 can communicate the log data to central computing system 170 via network(s) 180, and central computing system 170 can receive the log data.

At (428), autonomy computing system 102 can communicate log data indicating parameters of autonomous vehicle 10 to central computing system 170 via network(s) 180, and central computing system 170 can receive the log data. For example, the log data can indicate a time at which autonomous vehicle 10 detected the change in position of simulated cyclist 314, a time at which autonomous vehicle 10 executed a routine to bring autonomous vehicle 10 to a stop or otherwise modify its planned motion path, a time at which autonomous vehicle 10 came to a stop or otherwise modified its motion path, or the like. Additionally or alternatively, the log data can indicate a rate of acceleration of autonomous vehicle 10, a rate of deceleration of autonomous vehicle 10, a speed of autonomous vehicle 10, or a heading of autonomous vehicle 10 (e.g., when autonomous vehicle 10 detected the change in position of simulated cyclist 314, executed the routine to bring autonomous vehicle 10 to a stop or otherwise modify its planned motion path, and/or stopped or otherwise modified its motion path). At (430), user computing device 175 can receive feedback from a user (e.g., a passenger of autonomous vehicle 10) regarding the performance of autonomous vehicle 10. For example, user computing device 175 can receive feedback from a passenger of autonomous vehicle 10 describing the subjective experience of the passenger regarding the performance of autonomous vehicle 10 in responding to the change in position of simulated cyclist 314. At (432), user computing device 175 can communicate the feedback to central computing system 170 via network(s) 180, and central computing system 170 can receive the feedback.

At (434), central computing system 170 can analyze the log data received from node 222 and autonomy computing system 102. For example, central computing system 170 can compare the log data received from node 222 with the log data received from autonomy computing system 102 to determine a performance metric of autonomous vehicle 10. For example, central computing system 170 can compare a time indicated by the log data received from node 222 (e.g., a time at which the position of simulated cyclist 314 was modified) with a time indicated by the log data received from autonomy computing system 102 (e.g., a time at which autonomous vehicle 10 detected the change in the position of simulated cyclist 314, a time at which autonomous vehicle 10 executed a routine to bring autonomous vehicle 10 to a stop or otherwise modify the motion path of autonomous vehicle 10, and/or a time at which autonomous vehicle 10 was brought to a stop or otherwise modified its motion path) to determine a performance metric of autonomous vehicle 10 (e.g., how efficiently autonomous vehicle 10 responded to the change in position of simulated cyclist 314). Additionally or alternatively, central computing system 170 can compare one or more positions of simulated cyclist 314 with one or more positions of autonomous vehicle 10 to determine a performance metric of autonomous vehicle 10 (e.g., how close autonomous vehicle 10 came to simulated cyclist 314). In some implementations, the performance metric can be based on the feedback received from user computing device 175. For example, the performance metric can indicate a measure of smoothness in transition from one state to another of the autonomous vehicle (e.g., from a cruising speed to stop or from one motion path to another), the feedback received from user computing device 175 can describe the subjective experience of a passenger of autonomous vehicle 10 regarding the performance of autonomous vehicle 10 in responding to the change in position of simulated cyclist 314 (e.g., the smoothness of the stop or change in motion path executed by autonomous vehicle 10), and the performance metric can be based, at least in part, on the feedback received from user computing device 175.

At (436), node 224 can initialize a test for autonomous vehicle 10. For example, autonomous vehicle 10 can approach simulated vehicles 318 and 320, and sensor 316 can detect autonomous vehicle 10 approaching simulated vehicles 318 and 320. Node 224 can be configured to modify the status and/or position of one or more elements associated with simulated vehicles 318 and 320 in response to sensor 316 detecting autonomous vehicle 10. For example, node 224 can be configured to control one or more actuators configured to adjust the positions of simulated vehicles 318 and 320 on track 302, and in response to sensor 316 detecting autonomous vehicle 10, node 224 can modify the status and/or position of the actuator(s) to move simulated vehicles 318 or 320 into the path of autonomous vehicle 10. Node 224 can generate log data indicating a time at which sensor 316 detected autonomous vehicle 10 approaching simulated vehicles 318 and 320, one or more times at which the status and/or positions of element(s) associated with simulated vehicles 318 or 320 were modified, and/or the status and/or positions of the element(s) associated with simulated vehicles 318 and 320 (e.g., the status and/or position of the actuator(s) configured to adjust the position of simulated vehicles 318 and 320, a positon of simulated vehicles 318 and 320 on track 302, or the like). In some implementations, simulated vehicle 318 or 320 can include an attached global positioning system (GPS) receiver, and the log data received from node 224 can include GPS coordinates of simulated vehicle 318 or 320. Autonomous vehicle 10 can respond to the modification of the status or positions of the element(s) associated with simulated vehicles 318 and 320. For example, responsive to node 224 modifying the status and/or position of the actuator(s) to move simulated vehicles 318 or 320 into the path of autonomous vehicle 10, autonomous vehicle 10 can detect the change in the position of simulated vehicles 318 or 320 (e.g., that simulated vehicle 318 or 320 has moved into its path) and execute a routine to bring autonomous vehicle 10 to a stop or otherwise modify its planned motion path (e.g., to avoid a collision with simulated vehicle 318 or 320). At (438), node 224 can communicate the log data to central computing system 170 via network(s) 180, and central computing system 170 can receive the log data.

At (440), autonomy computing system 102 can communicate log data indicating parameters of autonomous vehicle 10 to central computing system 170 via network(s) 180, and central computing system 170 can receive the log data. For example, the log data can indicate a time at which autonomous vehicle 10 detected the change in positions of simulated vehicles 318 or 320, a time at which autonomous vehicle 10 executed a routine to bring autonomous vehicle 10 to a stop or otherwise modify its planned motion path, a time at which autonomous vehicle 10 came to a stop or otherwise modified its motion path, or the like. In some implementations, autonomous vehicle 10 can include a GPS receiver, and the log data received from autonomy computing system 102 can include GPS coordinates of autonomous vehicle 10. At (442), user computing device 175 can receive feedback from a user (e.g., a passenger of autonomous vehicle 10) regarding the performance of autonomous vehicle 10. For example, user computing device 175 can receive feedback from a passenger of autonomous vehicle 10 describing the subjective experience of the passenger regarding the performance of autonomous vehicle 10 in responding to the change in positions of simulated vehicles 318 or 320. At (444), user computing device 175 can communicate the feedback to central computing system 170 via network(s) 180, and central computing system 170 can receive the feedback.

At (446), central computing system 170 can analyze the log data received from node 224 and autonomy computing system 102. For example, central computing system 170 can compare the log data received from node 224 with the log data received from autonomy computing system 102 to determine a performance metric of autonomous vehicle 10. For example, central computing system 170 can compare a time indicated by the log data received from node 224 (e.g., a time at which the position of simulated vehicle 318 or 320 was modified) with a time indicated by the log data received from autonomy computing system 102 (e.g., a time at which autonomous vehicle 10 detected the change in the position of simulated vehicles 318 or 320, a time at which autonomous vehicle 10 executed a routine to bring autonomous vehicle 10 to a stop or otherwise modify the motion path of autonomous vehicle 10, and/or a time at which autonomous vehicle 10 was brought to a stop or otherwise modified its motion path) to determine a performance metric of autonomous vehicle 10 (e.g., how efficiently autonomous vehicle 10 responded to the change in positions of simulated vehicles 318 or 320). Additionally or alternatively, central computing system 170 can compare one or more positions of simulated vehicles 318 or 320 with one or more positions of autonomous vehicle 10 (e.g., based on the GPS coordinates received from node 224 and/or autonomy computing system 102) to determine a performance metric of autonomous vehicle 10 (e.g., how close autonomous vehicle 10 came to simulated vehicles 318 or 320). In some implementations, the performance metric can be based on the feedback received from user computing device 175. For example, the performance metric can indicate a measure of smoothness in transition from one state to another of the autonomous vehicle (e.g., from a cruising speed to stop or from one motion path to another), the feedback received from user computing device 175 can describe the subjective experience of a passenger of autonomous vehicle 10 regarding the performance of autonomous vehicle 10 in responding to the change in positions of simulated vehicles 318 or 320 (e.g., the smoothness of the stop or change in motion path executed by autonomous vehicle 10), and the performance metric can be based, at least in part, on the feedback received from user computing device 175.

Referring to FIG. 4C, at (448), node 226 can initialize a test for autonomous vehicle 10. For example, autonomous vehicle 10 can approach simulated pedestrian 324, and sensor 322 can detect autonomous vehicle 10 approaching simulated pedestrian 324. Node 226 can be configured to modify the status and/or position of one or more elements associated with simulated pedestrian 324 in response to sensor 322 detecting autonomous vehicle 10. For example, node 226 can be configured to control one or more actuators configured to adjust the position of simulated pedestrian 324 on track 302, and in response to sensor 322 detecting autonomous vehicle 10, node 226 can modify the status and/or position of the actuator(s) to move simulated pedestrian 324 into the path of autonomous vehicle 10. Node 226 can generate log data indicating a time at which sensor 322 detected autonomous vehicle 10 approaching simulated pedestrian 324, one or more times at which the status and/or positions of element(s) associated with simulated pedestrian 324 were modified, and/or the status and/or positions of the element(s) associated with simulated pedestrian 324 (e.g., the status and/or position of the actuator(s) configured to adjust the position of simulated pedestrian 324, a positon of simulated pedestrian 324 on track 302, or the like). Autonomous vehicle 10 can respond to the modification of the status or positions of the element(s) associated with simulated pedestrian 324. For example, responsive to node 226 modifying the status and/or position of the actuator(s) to move simulated pedestrian 324 into the path of autonomous vehicle 10, autonomous vehicle 10 can detect the change in the position of simulated pedestrian 324 (e.g., that simulated pedestrian 324 has moved into its path) and execute a routine to bring autonomous vehicle 10 to a stop or otherwise modify its planned motion path (e.g., to avoid a collision with simulated pedestrian 324). At (450), node 226 can communicate the log data to central computing system 170 via network(s) 180, and central computing system 170 can receive the log data.

At (452), autonomy computing system 102 can communicate log data indicating parameters of autonomous vehicle 10 to central computing system 170 via network(s) 180, and central computing system 170 can receive the log data. For example, the log data can indicate a time at which autonomous vehicle 10 detected the change in position of simulated pedestrian 324, a time at which autonomous vehicle 10 executed a routine to bring autonomous vehicle 10 to a stop or otherwise modify its planned motion path, a time at which autonomous vehicle 10 came to a stop or otherwise modified its motion path, or the like. At (454), user computing device 175 can receive feedback from a user (e.g., a passenger of autonomous vehicle 10) regarding the performance of autonomous vehicle 10. For example, user computing device 175 can receive feedback from a passenger of autonomous vehicle 10 describing the subjective experience of the passenger regarding the performance of autonomous vehicle 10 in responding to the change in position of simulated pedestrian 324. At (456), user computing device 175 can communicate the feedback to central computing system 170 via network(s) 180, and central computing system 170 can receive the feedback.

At (458), central computing system 170 can analyze the log data received from node 226 and autonomy computing system 102. For example, central computing system 170 can compare the log data received from node 226 with the log data received from autonomy computing system 102 to determine a performance metric of autonomous vehicle 10. For example, central computing system 170 can compare a time indicated by the log data received from node 226 (e.g., a time at which the position of simulated pedestrian 324 was modified) with a time indicated by the log data received from autonomy computing system 102 (e.g., a time at which autonomous vehicle 10 detected the change in the position of simulated pedestrian 324, a time at which autonomous vehicle 10 executed a routine to bring autonomous vehicle 10 to a stop or otherwise modify the motion path of autonomous vehicle 10, and/or a time at which autonomous vehicle 10 was brought to a stop or otherwise modified its motion path) to determine a performance metric of autonomous vehicle 10 (e.g., how efficiently autonomous vehicle 10 responded to the change in position of simulated pedestrian 324). Additionally or alternatively, central computing system 170 can compare one or more positions of simulated pedestrian 324 with one or more positions of autonomous vehicle 10 to determine a performance metric of autonomous vehicle 10 (e.g., how close autonomous vehicle 10 came to simulated pedestrian 324). In some implementations, the performance metric can be based on the feedback received from user computing device 175. For example, the performance metric can indicate a measure of smoothness in transition from one state to another of the autonomous vehicle (e.g., from a cruising speed to stop or from one motion path to another), the feedback received from user computing device 175 can describe the subjective experience of a passenger of autonomous vehicle 10 regarding the performance of autonomous vehicle 10 in responding to the change in position of simulated pedestrian 324 (e.g., the smoothness of the stop or change in motion path executed by autonomous vehicle 10), and the performance metric can be based, at least in part, on the feedback received from user computing device 175.

Figure 5:
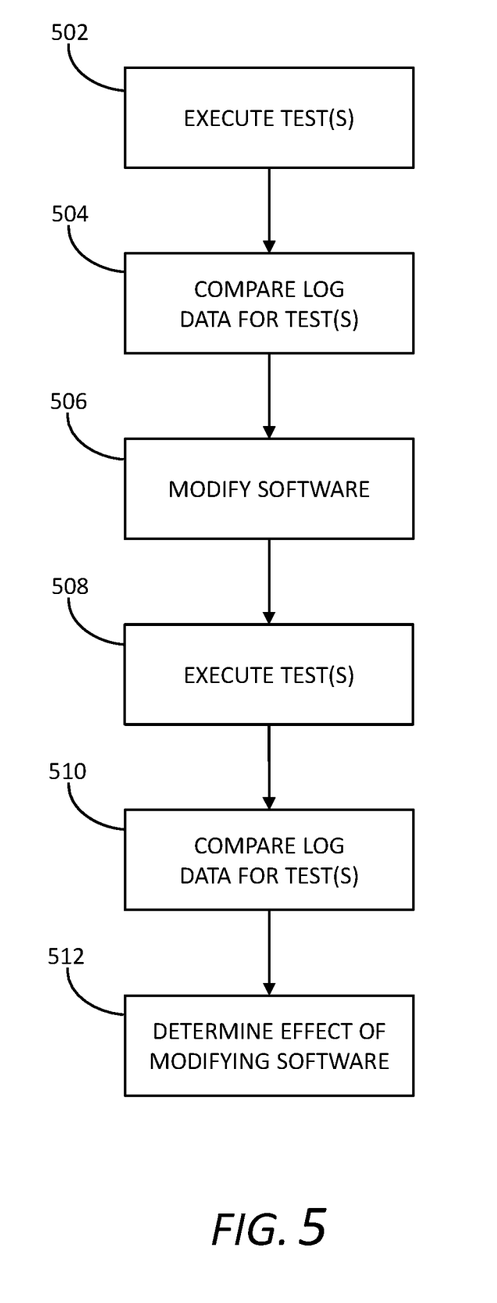
FIG. 5 depicts a flow chart diagram of an example method to test an autonomous vehicle according to example embodiments of the present disclosure.

FIG. 5 depicts a flow chart diagram of an example method to test an autonomous vehicle according to example embodiments of the present disclosure. Referring to FIG. 5, at (502), one or more tests can be executed for an autonomous vehicle. For example, one or more of the tests associated with nodes 210, 220, 222, 224, and/or 226 can be executed for autonomous vehicle 10. At (504), log data for the tests can be compared. For example, the log data for the tests associated with nodes 210, 220, 222, 224, and/or 226 can be compared to determine one or more performance metrics for autonomous vehicle 10. At (506), software of the autonomous vehicle can be modified. For example, software of autonomy computing system 102 (e.g., software configured to control operations of autonomous vehicle 10) can be modified. At (508), one or more tests can be executed for the autonomous vehicle. For example, one or more of the tests associated with nodes 210, 220, 222, 224, and/or 226 can be executed for autonomous vehicle 10 (e.g., autonomous vehicle 10 running the modified software). At (510), log data for the tests can be compared. For example, the log data for the tests associated with nodes 210, 220, 222, 224, and/or 226 can be compared to determine one or more performance metrics for autonomous vehicle 10. In some implementations, the log data for the tests associated with nodes 210, 220, 222, 224, and/or 226 (e.g., the log data associated with autonomous vehicle 10 running the modified software) can be compared to log data for the tests associated with nodes 210, 220, 222, 224, and/or 226 associated with previous iterations of the tests associated with nodes 210, 220, 222, 224, and/or 226 (e.g., the log data associated with autonomous vehicle 10 prior to modifying the software). At (512), an effect of modifying the software of the autonomous vehicle can be determined. For example, a determination can be made as to whether modifying the software of autonomy computing system 102 improved or degraded the performance of autonomous vehicle 10 (e.g., by comparing the performance metrics determined at (410), (422), (434), (446), and/or (458) prior to the software modification with performance metrics determined at (410), (422), (434), (446), and/or (458) subsequent to the software modification).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for autonomous vehicle testing, the method comprising:
   receiving, by a computing system comprising one or more computing devices and from one or more test nodes of a preconfigured test track, log data indicating positions of elements of the test track over a period of time;
   receiving, by the computing system and from an autonomous vehicle, log data indicating parameters of the autonomous vehicle over the period of time; and comparing, by the computing system, the log data indicating the positions of the elements of the test track over the period of time with the log data indicating the parameters of the autonomous vehicle over the period of time to determine a performance metric of the autonomous vehicle on the test track over the period of time.

2. The computer-implemented method of claim 1, wherein receiving the log data indicating the positions of the elements of the test track comprises receiving data indicating the position or status of one or more actuators associated with the elements.

3. The computer-implemented method of claim 1, wherein receiving the log data indicating the positions of the elements of the test track comprises receiving data from one or more global positioning system (GPS) receivers attached to the elements.

4. The computer-implemented method of claim 1, wherein receiving the log data indicating the parameters of the autonomous vehicle comprises receiving data from a global positioning system (GPS) receiver of the autonomous vehicle.

5. The computer-implemented method of claim 1, wherein receiving the log data indicating the parameters of the autonomous vehicle comprises receiving data indicating one or more of a rate of acceleration of the autonomous vehicle, a rate of deceleration of the autonomous vehicle, a speed of the autonomous vehicle, or a heading of the autonomous vehicle.

6. The computer-implemented method of claim 1, further comprising comparing the performance metric of the autonomous vehicle on the test track over the period of time with a performance metric of the autonomous vehicle on the test track over a previous period of time.

7. The computer-implemented method of claim 6, further comprising, prior to the period of time and subsequent to the previous period of time, modifying, by the computing system, software configured to control operations of the autonomous vehicle.

8. The computer-implemented method of claim 1, further comprising receiving, by the computing system from a user device, feedback describing performance of the autonomous vehicle over the period of time, wherein the performance metric is determined based at least in part on the feedback.

9. The computer-implemented method of claim 1, wherein the comparing comprises determining a position of the autonomous vehicle relative to at least one of a simulated vehicle on the test track, a simulated pedestrian on the test track, or a simulated cyclist on the test track.

10. A computing system comprising:
one or more processors; and
one or more non-transitory computer-readable media that collectively store instructions that, when executed by the one or more processors, cause the computing system to perform operations, the operations comprising:
comparing log data indicating positions of elements of a test track over a first period of time with log data indicating parameters of an autonomous vehicle over the first period of time to determine a performance metric of the autonomous vehicle on the test track over the first period of time;
comparing log data indicating positions of the elements of the test track over a second period of time with log data indicating parameters of the autonomous vehicle over the second period of time to determine a performance metric of the autonomous vehicle on the test track over the second period of time; and
comparing the performance metric of the autonomous vehicle on the test track over the first period of time with the performance metric of the autonomous vehicle on the test track over the second period of time to determine an effect of modifying software configured to control operations of the autonomous vehicle.

11. The computer-implemented method of claim 1, wherein the performance metric is associated with a change in motion during a transition from one state to another of the autonomous vehicle.

12. The computing system of claim 10, wherein the operations further comprise:
receiving, from a user device, feedback describing performance of the autonomous vehicle over the first period of time and the second period of time; and
determining the effect of modifying the software configured to control operations of the autonomous vehicle based at least in part on the feedback.

13. The computing system of claim 10, wherein:
the log data indicating the positions of the elements of the test track over the first period of time indicates a position of at least one of a simulated vehicle on the test track, a simulated pedestrian on the test track, or a simulated cyclist on the test track; and
the log data indicating the positions of the elements of the test track over the second period of time indicates a position of the at least one of the simulated vehicle on the test track, the simulated pedestrian on the test track, or the simulated cyclist on the test track.

14. The computing system of claim 10, wherein the parameters of the autonomous vehicle comprise one or more of a rate of acceleration of the autonomous vehicle, a rate of deceleration of the autonomous vehicle, a speed of the autonomous vehicle, or a heading of the autonomous vehicle.

15. The computing system of claim 10, wherein the performance metric is associated with a change in motion during a transition from one state to another of the autonomous vehicle.

16. One or more non-transitory computer-readable media that collectively store instructions that, when executed by one or more processors, cause a computing system to perform operations, the operations comprising:
comparing log data indicating positions of elements of a test track over a first period of time with log data indicating positions of the elements of the test track over a second period of time;
comparing log data indicating parameters of an autonomous vehicle over the first period of time with log data indicating the parameters of the autonomous vehicle over the second period of time; and
determining an effect of modifying, between the first period of time and the second period of time, software configured to control operations of the autonomous vehicle.

17. The one or more non-transitory computer-readable media of claim 16, wherein the elements of the test track comprise at least one of a simulated vehicle, a simulated pedestrian, or a simulated cyclist.

18. The one or more non-transitory computer-readable media of claim 16, wherein determining the effect of modifying the software comprises determining at least one of a rate of change of a speed of the autonomous vehicle or a heading of the autonomous vehicle in transition from one state to another of the autonomous vehicle.

19. The one or more non-transitory computer-readable media of claim 16, wherein the parameters of the autonomous vehicle comprise one or more of a rate of acceleration of the autonomous vehicle, a rate of deceleration of the autonomous vehicle, a speed of the autonomous vehicle, or a heading of the autonomous vehicle.

20. The one or more non-transitory computer-readable media of claim 16, wherein determining the effect of modifying the software comprises determining the effect of modifying the software based at least in part on feedback, received from a user device, describing performance of the autonomous vehicle over the first period of time and the second period of time.

* * * * *